United States Patent
Bisaiji et al.

(10) Patent No.: US 8,333,064 B2
(45) Date of Patent: Dec. 18, 2012

(54) EXHAUST GAS PURIFICATION APPARATUS FOR INTERNAL COMBUSTION ENGINE

(75) Inventors: Yuki Bisaiji, Mishima (JP); Koichiro Fukuda, Numazu (JP); Mikio Inoue, Susono (JP); Satoru Nitta, Toyoake (JP); Kiyohiko Nagae, Toki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 290 days.

(21) Appl. No.: 12/674,111

(22) PCT Filed: Aug. 6, 2008

(86) PCT No.: PCT/JP2008/064139
§ 371 (c)(1),
(2), (4) Date: Feb. 18, 2010

(87) PCT Pub. No.: WO2009/037924
PCT Pub. Date: Mar. 26, 2009

(65) Prior Publication Data
US 2011/0192150 A1   Aug. 11, 2011

(30) Foreign Application Priority Data
Sep. 21, 2007   (JP) .................................. 2007-245007

(51) Int. Cl.
*F01N 3/00* (2006.01)
(52) U.S. Cl. ................ 60/295; 60/286; 60/301; 60/303; 239/90; 239/91; 239/399; 239/432; 239/433; 222/145.5; 222/145.6
(58) Field of Classification Search ............ 60/286, 60/295, 297, 301, 303; 239/89, 90, 91, 398, 239/399, 432, 433; 222/145.5, 145.6
See application file for complete search history.

(56) References Cited

U.S. PATENT DOCUMENTS
6,449,947 B1 *   9/2002   Liu et al. ..................... 60/286
(Continued)

FOREIGN PATENT DOCUMENTS
DE   198 06 265 C1   7/1999
(Continued)

OTHER PUBLICATIONS
Jul. 25, 2011 Office Action issued in Chinese Patent Application No. 200880104406.7 (with English Translation).
(Continued)

*Primary Examiner* — Binh Q Tran
(74) *Attorney, Agent, or Firm* — Oliff & Berridge, PLC

(57) ABSTRACT

In an exhaust gas purification apparatus for an internal combustion engine, reducing agent is diffused and the exhaust resistance is made small. The apparatus includes a reducing agent addition valve that injects reducing agent, a reducing agent addition valve mount portion that has a space in which the reducing agent addition valve injects the reducing agent outside a stream of exhaust gas flowing in an exhaust passage of an internal combustion engine and on which the reducing agent addition valve is mounted, and an impingement portion that is provided in the reducing agent addition valve mount portion and on which the reducing agent injected through the reducing agent addition valve impinges, wherein the direction of injection of the reducing agent from the reducing agent addition valve is oriented toward the impingement portion, and toward downstream of the reducing agent addition valve with respect to the exhaust gas flow.

7 Claims, 5 Drawing Sheets

U.S. PATENT DOCUMENTS

| | | | |
|---|---|---|---|
| 6,539,708 B1 * | 4/2003 | Hofmann et al. | 60/286 |
| 6,601,385 B2 * | 8/2003 | Verdegan et al. | 60/286 |
| 6,969,492 B1 | 11/2005 | Goerigk et al. | |
| 7,021,047 B2 * | 4/2006 | Hilden et al. | 60/286 |
| 7,448,206 B2 * | 11/2008 | Meingast et al. | 60/286 |
| 7,788,907 B2 * | 9/2010 | Koehler et al. | 60/286 |
| 8,079,211 B2 * | 12/2011 | Levin et al. | 60/286 |
| 8,082,732 B2 * | 12/2011 | Nefischer | 60/300 |
| 2004/0237511 A1 | 12/2004 | Ripper et al. | |
| 2007/0036694 A1 | 2/2007 | Nishioka et al. | |

FOREIGN PATENT DOCUMENTS

| | | |
|---|---|---|
| DE | 10 2005 061 145 A1 | 6/2007 |
| EP | 1 054 139 A1 | 11/2000 |
| EP | 1 748 162 A1 | 1/2007 |
| JP | U 1-107425 | 7/1989 |
| JP | U 5-1818 | 1/1993 |
| JP | A 2000-352305 | 12/2000 |
| JP | A 2002-503783 | 2/2002 |
| JP | A 2002-89255 | 3/2002 |
| JP | A 2004-197635 | 7/2004 |
| JP | A 2004-532954 | 10/2004 |
| JP | A 2006-9608 | 1/2006 |
| JP | A 2007-32472 | 2/2007 |
| WO | WO 2005/005799 A1 | 1/2005 |

OTHER PUBLICATIONS

May 26, 2011 Supplemental European Search Report issued in EP 08 83 2335.7.

International Search Report issued for International Application No. PCT/JP2008/064139 on Nov. 18, 2008 (w/ translation).

* cited by examiner

[Fig. 1]
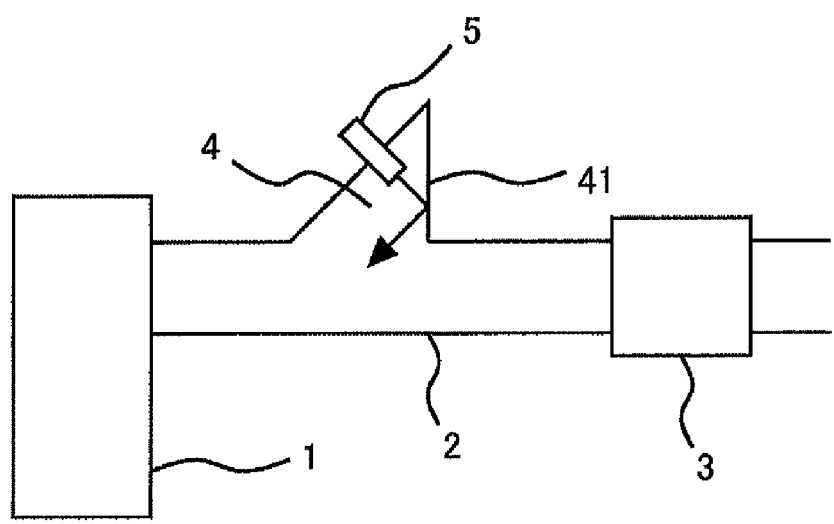

[Fig. 2]
(A)
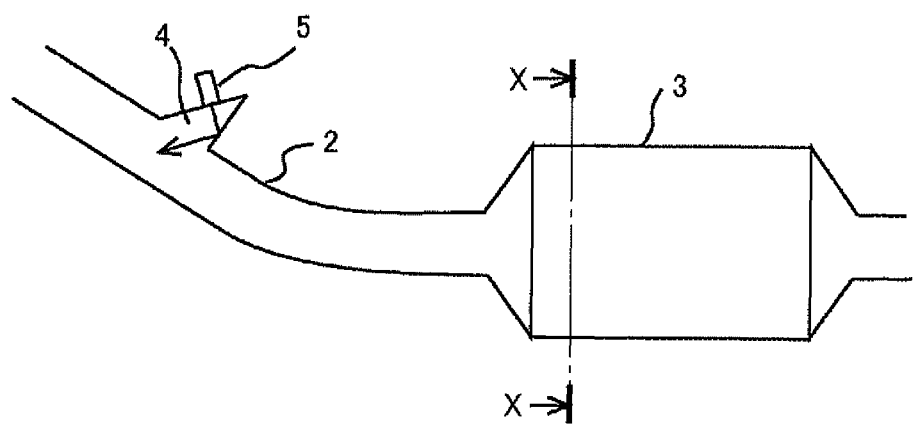
(B)
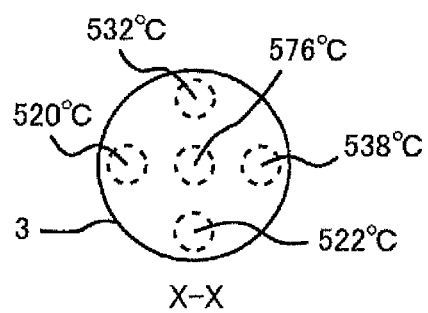
X-X

[Fig. 3]
(A)
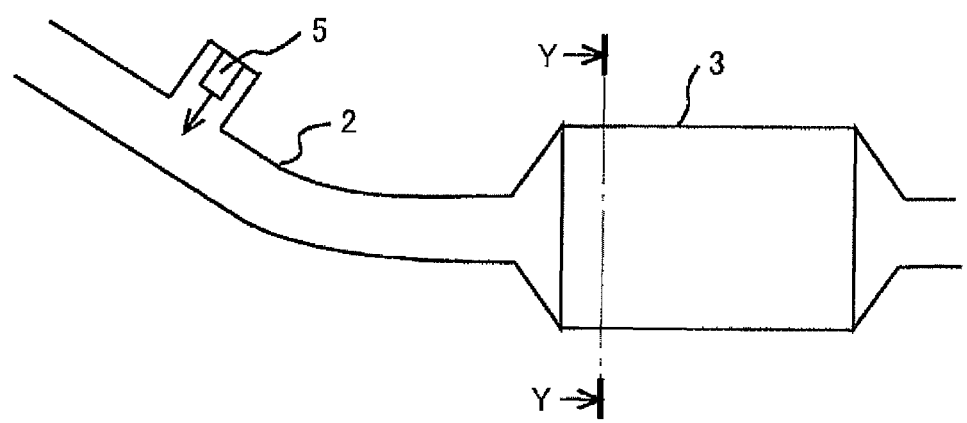
(B)
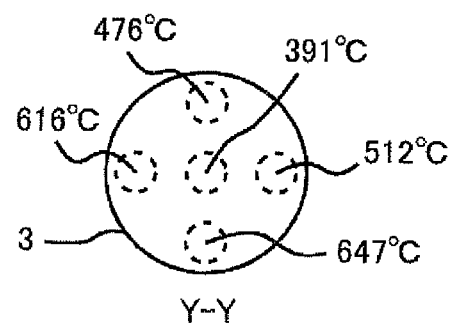
Y-Y

[Fig. 4]
(A)
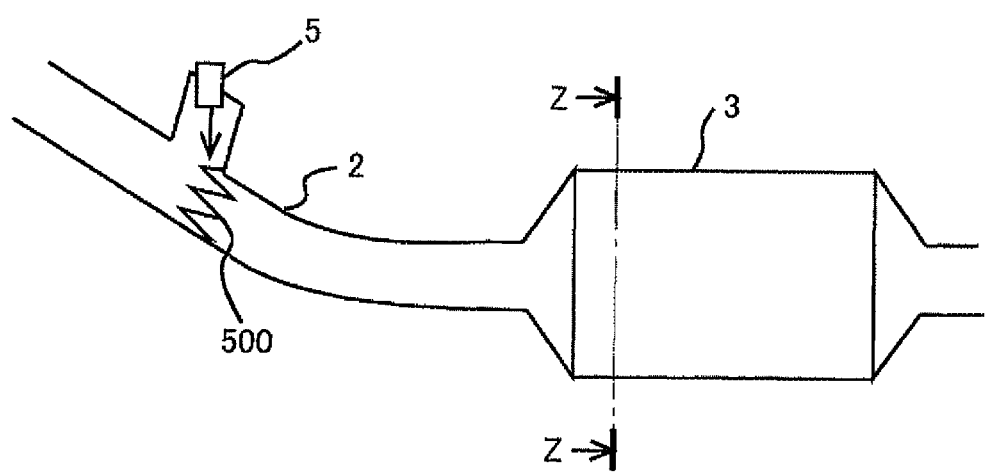
(B)
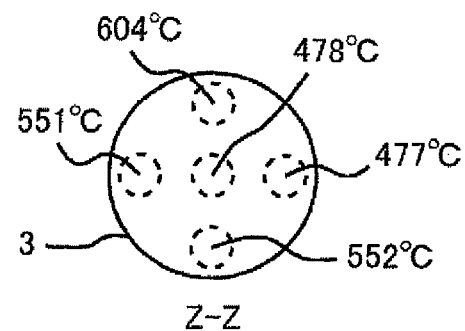
Z-Z

[Fig. 5]
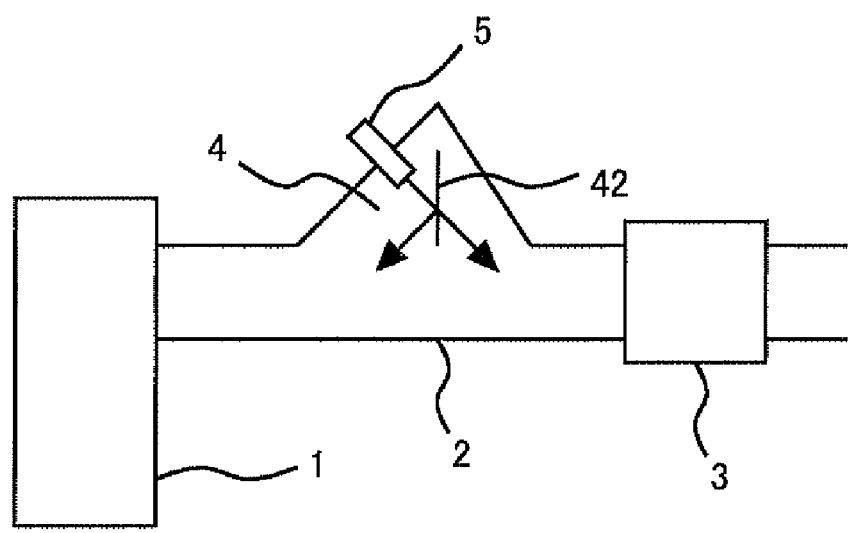

EXHAUST GAS PURIFICATION APPARATUS FOR INTERNAL COMBUSTION ENGINE

This application is the national phase application under 35 U.S.C. §371 of PCT international application No. PCT/JP2008/064139 filed on 6 Aug. 2008, which claims priority to Japanese patent application No. 2007-245007 filed on 21 Sep. 2007, the contents of which are incorporated herein by reference.

TECHNICAL FIELD

The present invention relates to an exhaust gas purification apparatus for an internal combustion engine.

BACKGROUND ART

There has been known a technology in which a reducing agent is supplied to a catalyst provided in an exhaust passage of an internal combustion engine to remove NOx, raise the temperature of the catalyst, and/or regenerate a filter. There has also been known a technology of providing an impingement wall on which the reducing agent is to impinge or strike, at a very short distance from the injection port of a reducing agent addition valve (see for example, Patent Document 1). According to this technology, since the reducing agent impinges on the impingement wall before it flows downstream with the stream of the exhaust gas, the atomization of the reducing agent is promoted. In addition, since the injection port is not directly exposed to the stream of the exhaust gas, clogging of the injection port can be prevented.

Patent Document 1: Japanese Patent Application Laid-Open No. 2002-89255
Patent Document 2: Japanese Patent Application Laid-Open No. 2006-9608
Patent Document 3: Japanese Patent Application Laid-Open No. 2007-32472
Patent Document 4: Japanese Patent Application Laid-Open No. 2004-532954

DISCLOSURE OF THE INVENTION

Problem to be Solved by the Invention

However, the presence of the impingement wall in the stream of the exhaust gas leads to an increase in the exhaust resistance, which in turns leads to an increase in the pressure loss. This may invite a deterioration in the function of the internal combustion engine.

The present invention has been made in view of the above described problem and has an object to provide a technology that enables a decrease in the exhaust resistance while diffusing the reducing agent in an exhaust gas purification apparatus for an internal combustion engine.

Means for Solving the Problem

To achieve the above object, the following means is adopted in an exhaust gas purification apparatus for an internal combustion engine according to the present invention. Specifically, an exhaust gas purification apparatus for an internal combustion engine according to the present invention is characterized by comprising:
a reducing agent addition valve that injects reducing agent;
a reducing agent addition valve mount portion that has a space in which said reducing agent addition valve injects the reducing agent outside a stream of exhaust gas flowing in an exhaust passage of an internal combustion engine and on which said reducing agent addition valve is mounted; and
an impingement portion that is provided in said reducing agent addition valve mount portion and on which the reducing agent injected through said reducing agent addition valve impinges,
wherein the direction of injection of the reducing agent from said reducing agent addition valve is oriented toward said impingement portion, downstream from the reducing agent addition valve with respect to the exhaust gas flow.

As described above, since the reducing agent addition valve mount portion is provided outside the stream of the exhaust gas and the direction of injection of the reducing agent is oriented downstream from the reducing agent addition valve, the injection port of the reducing agent addition valve is prevented from being exposed directly to the stream of the exhaust gas, and therefore clogging of the injection port can be prevented from occurring. Furthermore, since the impingement portion is located outside the stream of the exhaust gas, an increase in the pressure loss can be prevented. Still further, as the reducing agent impinges on the impingement portion, atomization of the reducing agent can be promoted. In addition, since the presence of the impingement portion in the reducing agent addition valve mount portion can prevent the reducing agent injected through the reducing agent addition valve from being brought by the stream of the exhaust gas, a larger amount of reducing agent can impinge on the impingement portion at high speed. This facilitates atomization of the reducing agent.

According to the present invention, said impingement portion may be provided in such a way that the entire amount of the reducing agent injected through the reducing agent addition valve impinges on said impingement portion, and the reducing agent bouncing off the impingement portion reaches the stream of the exhaust gas flowing in the exhaust passage.

Thus, the entire amount of the reducing agent is caused to impinge on the impingement portion and thereafter travel to the stream of the exhaust gas. This promotes atomization of the reducing agent and mixing of the exhaust gas and the reducing agent.

According to the present invention, said impingement portion may comprise a plate having a plurality of holes, and said impingement portion may be provided in such a way that the reducing agent passing through the holes and the reducing agent bouncing off the plate reach the stream of the exhaust gas flowing in the exhaust passage.

Thus, by providing holes on the impingement portion, a portion of the reducing agent is allowed to pass through it. In addition, the size and the position of the holes may be adjusted in such a way that atomization of the reducing agent is promoted also as the reducing agent passes through the holes of the impingement portion. By regulating the ratio of the reducing agent thus passing through the impingement portion, the concentration of the reducing agent in the exhaust gas can be adjusted. In addition, if the impingement portion is designed in such a way that both the reducing agent passing through the holes and the reducing agent bouncing off the plate reach a stream of exhaust gas flowing in the exhaust passage, mixing of the exhaust gas and the reducing agent can be promoted.

Effect of the Invention

According to the exhaust gas purification apparatus according to the present invention, the reducing agent can be diffused, and the exhaust resistance can be reduced.

BRIEF DESCRIPTION OF THE DRAWINGS

FIG. 1 is a diagram showing the general configuration of an internal combustion engine to which an exhaust gas purification apparatus for an internal combustion engine according to embodiment 1 is applied and its air-intake and exhaust system.

FIG. 2 shows a temperature distribution in a catalyst at the time when the reducing agent is added in a case where a reducing agent injection chamber and a reducing agent addition valve according to embodiment 1 are provided. FIG. 2A schematically shows the configuration of the apparatus, and FIG. 2B shows the temperature distribution.

FIG. 3 shows a temperature distribution in a catalyst at the time when the reducing agent is added in a case where the reducing agent injection chamber according to embodiment 1 is not provided and the reducing agent is directly added to the exhaust gas through the reducing agent addition valve. FIG. 3A schematically shows the configuration of the apparatus, and FIG. 3B shows the temperature distribution.

FIG. 4 shows a temperature distribution in a catalyst at the time when the reducing agent is added in a case where the reducing agent injection chamber according to embodiment 1 is not provided and a diffusion plate on which the reducing agent is to impinge is provided in the stream of the exhaust gas. FIG. 4A schematically shows the configuration of the apparatus, and FIG. 4B shows the temperature distribution.

FIG. 5 is a diagram showing the general configuration of an internal combustion engine to which an exhaust gas purification apparatus for an internal combustion engine according to embodiment 2 is applied and its air-intake and exhaust system.

EXPLANATION OF SYMBOLS

1: internal combustion engine
2: exhaust passage
3: catalyst
4: reducing agent injection chamber
5: reducing agent addition valve
41: impingement wall
42: impingement plate
500: diffusion plate

THE BEST MODE FOR CARRYING OUT THE INVENTION

In the following, specific embodiments of the exhaust gas purification apparatus according to the present invention will be described with reference to the drawings.
(Embodiment 1)

FIG. 1 is a diagram showing the general configuration of an internal combustion engine 1 to which the exhaust gas purification apparatus for an internal combustion engine according to this embodiment is applied and its air-intake and exhaust system. The internal combustion engine 1 shown in FIG. 1 is a water-cooled, four-cycle diesel engine having four cylinders.

The internal combustion engine 1 is connected with an exhaust passage 2. A catalyst 3 that requires a reducing agent is provided in the middle of the exhaust passage 2. The catalyst 3 may be, for example, an NOx storage reduction catalyst, an NOx selective reduction catalyst, or an oxidation catalyst. Alternatively, the catalyst 3 may be a particulate filter on which a catalyst is supported, or a particulate filter anteceded by a catalyst provided upstream thereof.

A reducing agent injection chamber 4 is annexed to the exhaust passage 2 upstream of the catalyst 3. The reducing agent injection chamber 4 is located at a position that would be outside the exhaust passage 2 if the reducing agent injection chamber 4 were not provided. In other words, the reducing agent injection chamber 4 is provided at a position outside the stream of the exhaust gas. The reducing agent injection chamber 4 opens to the exhaust passage 2. A reducing agent addition valve 5 is provided in the reducing agent injection chamber 4. The reducing agent addition valve 5 injects reducing agent toward an impingement wall 41 provided in the reducing agent injection chamber 4. The reducing agent may be, for example, fuel or urea. In this embodiment, the reducing agent injection chamber 4 corresponds to the reducing agent addition valve mount portion according to the present invention. The impingement wall 41 in this embodiment corresponds to the impingement portion according to the present invention.

The reducing agent addition valve 5 is mounted in such a way that the direction of injection of the reducing agent from the reducing agent addition valve 5 is oriented downstream with respect to the flow of the exhaust gas. This means that the reducing agent is injected downstream in relation to the plane perpendicular to the center axis of the exhaust passage 2 and containing the injection port of the reducing agent addition valve 5, and the reducing agent need not be injected parallel to the direction of flow of the exhaust gas.

The impingement wall 41 is configured in such a way that the direction normal to the impingement wall 41 is oriented upstream with respect to the flow of the exhaust gas. This means that the impingement wall 41 is oriented upstream with respect to the plane perpendicular to the center axis of the exhaust passage 2 and containing a certain point on the impingement wall 41, and it is not necessary that the direction of flow of the exhaust gas and the direction normal to the impingement wall are parallel. The impingement wall 41 may have a surface that is not flat.

The mount position and injection angle of the reducing agent addition valve 5 and the position and orientation of the impingement wall 41 are determined in such a way that the reducing agent injected through the reducing agent addition valve 5 and thereafter impinging on and bouncing off the impingement wall 41 becomes involved in the stream of the exhaust gas flowing in the exhaust passage 2. In addition, the distance between the reducing agent addition valve 5 and the impingement wall 41 is made as small as possible. Furthermore, the reducing agent addition valve 5 and the impingement wall 41 are provided in such a way that the entire amount of the reducing agent injected through the reducing agent addition valve 5 impinges on the impingement wall 41. The arrow in FIG. 1 indicates the direction of the travel of the reducing agent.

By disposing the reducing agent injection chamber 4 and the reducing agent addition valve 5 in this way, the reducing agent injection chamber 4 and the reducing agent addition valve 5 are kept away from the way along which the exhaust gas flows in the exhaust passage 2. Therefore, an increase in the exhaust resistance can be prevented, and consequently an increase in the pressure loss can be prevented.

Furthermore, since the injection port of the reducing agent addition valve 5 is oriented downstream with respect to the flow of the exhaust gas, the speed of the reducing agent is not decreased. Therefore, a decrease in the penetration of the reducing agent can be prevented. Still further, since the exhaust gas does not strike the injection port directly, clogging of the injection port can be prevented from being caused by adhesion of deposits.

By making the distance between the reducing agent addition valve 5 and the impingement wall 41 short, the reducing agent can be prevented from being blown by the stream of the exhaust gas. In other words, it is possible to cause a larger quantity of reducing agent to impinge on the impingement wall 41. Furthermore, it is possible to cause the reducing agent to impinge on the impingement wall 41 without losing its high speed. Therefore, the reducing agent can be prevented from adhering to the impingement wall 41, and the atomization of the reducing agent can be promoted.

By adjusting the direction of injection of the reducing agent through the reducing agent addition valve 5 and the angle of the impingement wall 41, it is possible to cause the reducing agent to become involved in the stream of the exhaust gas. Therefore, mixing of the reducing agent and the exhaust gas can be promoted.

To prevent an increase in the pressure loss, the height of the impingement wall 41 (i.e. the distance by which the impingement wall projects outwardly from the outer wall of the exhaust passage 2) may be designed to be in the range of 20 to 50 millimeters.

FIG. 2 shows a temperature distribution in the catalyst 3 at the time when the reducing agent is added in a case where the reducing agent injection chamber 4 and the reducing agent addition valve 5 according to this embodiment are provided. FIG. 2A is a schematic diagram showing the configuration of the apparatus, and FIG. 2b shows the temperature distribution. FIG. 2B is an X-X cross sectional view taken along sectional line X perpendicular to the center axis of the catalyst 3. The temperature distribution of the catalyst 3 was obtained by experiments. As shown in FIG. 2B, the maximum temperature difference between the central portion and the peripheral portion of the catalyst 3 is 56° C. The temperature at the central portion of the catalyst 3 is highest.

FIG. 3 shows a temperature distribution in the catalyst 3 at the time when the reducing agent is added in a case where the reducing agent injection chamber 4 according to this embodiment is not provided and the reducing agent is injected directly into the exhaust gas through the reducing agent addition valve. FIG. 3A is a schematic diagram showing the configuration of the apparatus, and FIG. 3B shows the temperature distribution. FIG. 3B is a Y-Y cross sectional view taken along sectional line Y perpendicular to the center axis of the catalyst 3. The temperature distribution of the catalyst 3 was obtained by experiments.

In the case where the impingement wall 41 according to this embodiment is not provided, the reducing agent injected through the reducing agent addition valve impinges on the opposed wall. In this case, since the speed of the reducing agent is decreased by the flow of the exhaust gas, a large portion of the reducing agent adheres to the wall surface of the exhaust passage 2 and diffuses therefrom. In consequence, the temperature in the catalyst 3 becomes particularly high in the portion on the side of the wall opposed to the reducing agent addition valve. In addition, the temperature rise in the central portion of the catalyst 3 is insufficient. As shown in FIG. 3B, the maximum temperature difference between the central portion and the peripheral portion of the catalyst 3 is 256° C.

FIG. 4 shows a temperature distribution in the catalyst 3 at the time when the reducing agent is added in a case where the reducing agent injection chamber 4 according to this embodiment is not provided and a diffusion plate 500 on which the reducing agent is to impinge is provided in the stream of the exhaust gas. FIG. 4A is a schematic diagram showing the configuration of the apparatus, and FIG. 4B shows the temperature distribution. FIG. 4B is a Z-Z cross sectional view taken along sectional line Z perpendicular to the center axis of the catalyst 3. The temperature distribution of the catalyst 3 was obtained by experiments.

As the reducing agent impinges on the diffusion plate 500, atomization of the reducing agent is promoted more greatly as compared to the case shown in FIG. 3. However, the temperature rise in the central portion of the catalyst 3 is insufficient. In other words, the penetration of the reducing agent is decreased by the flow of the exhaust gas as the reducing agent injected through the reducing agent addition valve travels to the diffusion plate 500. For this reason, it is considered that the reducing agent does not impinge on the diffusion plate 500, or even if the reducing agent impinges on the diffusion plate 500, the speed of the reducing agent is so low that the atomization is not achieved sufficiently. As shown in FIG. 4B, the maximum temperature difference between the central portion and the peripheral portion of the catalyst 3 is 126° C.

As described above, according to this embodiment, the temperature difference in the catalyst 3 can be made small. In addition, the temperature in the central portion of the catalyst 3 can be raised sufficiently.

Any structure other than the structure according to this embodiment may also be adopted as long as all of the following conditions (1) to (4) are met: (1) a wall on which the reducing agent impinges is provided at a very short distance from the reducing agent addition valve outside the exhaust passage 2; (2) the reducing agent addition valve is so arranged that the reducing agent is injected in such a direction that the reducing agent is not directly exposed to the flow of the exhaust gas; (3) the reducing agent bouncing off the wall merges with the stream of the exhaust gas flowing in the exhaust passage; and (4) the entire amount of the reducing agent impinges on the wall.

(Embodiment 2)

This embodiment differs from embodiment 1 in that an impingement plate 42 on which the reducing agent is to impinge is provided in a reducing agent injection chamber 4, and the impingement wall 41 is not provided.

FIG. 5 is a diagram showing the general configuration of an internal combustion engine to which the exhaust gas purification apparatus for an internal combustion engine according to this embodiment is applied and its air-intake and exhaust system.

The reducing agent addition valve 5 injects reducing agent toward the impingement plate 42. The impingement plate 42 is disposed at such a position that the entire amount of the reducing agent injected through the reducing agent addition valve 5 impinges on it.

The reducing agent addition valve 5 is mounted in such a way that the direction of injection of the reducing agent from the reducing agent addition valve 5 is oriented downstream with respect to the flow of the exhaust gas. This means that the reducing agent is injected downstream in relation to the plane perpendicular to the center axis of the exhaust passage 2 and containing the injection port of the reducing agent addition valve 5, and the reducing agent need not be injected parallel to the direction of flow of the exhaust gas.

The impingement plate 42 is provided with a plurality of holes that allow a portion of the reducing agent to pass. The impingement plate 42 may be constructed as a single plate having a plurality of holes formed through it or a grid-like arrangement of metal or resin bars or fibers. It may also be a woven mesh made of a metal or resin. In this embodiment, the impingement plate 42 corresponds to the "impingement portion" and the "plate having a plurality of holes" according to the present invention.

Thus, a portion of the reducing agent injected through the reducing agent addition valve 5 passes through the holes of the impingement plate 42. Then, as the reducing agent passes through the holes while striking the impingement plate 42, the reducing agent is atomized. In addition, as the reducing agent passes through the impingement plate 42, the gas is greatly disturbed in the regions around the holes, which promotes the atomization.

Furthermore, the atomization of the reducing agent impinging on and bouncing off the impingement plate 42 is promoted by the impingement.

The mount position and injection angle of the reducing agent addition valve 5 and the shape and position of the impingement plate 42 are determined in such a way that the reducing agent injected through the reducing agent addition valve 5 and thereafter passing through the holes or impinging on and bouncing off the impingement plate 42 becomes involved in the stream of the exhaust gas flowing in the exhaust passage 2. The number and position of the holes on the impingement plate 42 are also determined similarly. These conditions may be determined by experiments. The arrows in FIG. 5 indicate directions in which the reducing agent travels.

According to this embodiment as described above, atomization of the reducing agent can be promoted. In addition, since the reducing agent addition valve 5 is not directly exposed to the flow of the exhaust gas, clogging of the injection port of the reducing agent addition valve 5 can be prevented. Furthermore, since the reducing agent addition valve 5 and the impingement plate 42 are not located in the stream of the exhaust gas, an increase in the exhaust loss can be prevented.

The invention claimed is:

1. An exhaust gas purification apparatus for an internal combustion engine comprising:
   a reducing agent addition valve that injects reducing agent;
   a reducing agent addition valve mount portion that has a space in which the reducing agent addition valve injects the reducing agent outside a stream of exhaust gas flowing in an exhaust passage of an internal combustion engine and on which the reducing agent addition valve is mounted; and
   an impingement portion that exists outside the stream of exhaust gas and in reducing agent addition valve mount portion, where the reducing agent injected through the reducing agent addition valve impinges,
   wherein a direction of injection of the reducing agent from the reducing agent addition valve is oriented toward the impingement portion, downstream from the reducing agent addition valve with respect to the exhaust gas flow.

2. An exhaust gas purification apparatus according to claim 1, wherein the impingement portion is provided in such a way that the entire amount of the reducing agent injected through the reducing agent addition valve impinges on the impingement portion, and the reducing agent bouncing off the impingement portion reaches a stream of exhaust gas flowing in the exhaust passage.

3. An exhaust gas purification apparatus according to claim 1, wherein the impingement portion comprises a plate having a plurality of holes, and the impingement portion is provided in such a way that the reducing agent passing through the holes and the reducing agent bouncing off the plate reach a stream of the exhaust gas flowing in the exhaust passage.

4. An exhaust gas purification apparatus according to claim 1, wherein the impingement portion abuts the reducing agent addition valve mount portion such that when the reducing agent is injected, and the reducing agent impinges on the impingement portion before reaching the stream of exhaust gas.

5. An exhaust gas purification apparatus according to claim 1, wherein the impingement portion abuts the reducing agent addition valve mount portion such that when the reducing agent is injected, and the reducing agent impinges on the impingement portion outside the stream of exhaust gas.

6. An exhaust gas purification apparatus according to claim 1, the reducing agent addition valve mount portion having a slanted surface that defines an opening in which the reducing agent addition valve injects the reducing agent.

7. An exhaust gas purification apparatus according to claim 1, the impingement portion having a planar surface that is substantially perpendicular to the stream of exhaust gas.

* * * * *